(12) United States Patent
Kuriyama et al.

(10) Patent No.: US 12,394,002 B2
(45) Date of Patent: Aug. 19, 2025

(54) INFORMATION DISPLAY DEVICE AND INFORMATION DISPLAY SYSTEM

(71) Applicant: TOYOTA JIDOSHA KABUSHIKI KAISHA, Toyota (JP)

(72) Inventors: Tomoyuki Kuriyama, Inagi (JP); Hinata Ichikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 18/207,347

(22) Filed: Jun. 8, 2023

(65) Prior Publication Data

US 2024/0054582 A1  Feb. 15, 2024

(30) Foreign Application Priority Data

Aug. 12, 2022  (JP) ................ 2022-129094

(51) Int. Cl.
| | |
|---|---|
| *G06Q 50/14* | (2012.01) |
| *G01C 21/00* | (2006.01) |
| *G01C 21/34* | (2006.01) |
| *G06Q 10/0631* | (2023.01) |

(52) U.S. Cl.
CPC ......... *G06Q 50/14* (2013.01); *G01C 21/3461* (2013.01); *G01C 21/3826* (2020.08); *G06Q 10/06315* (2013.01)

(58) Field of Classification Search
CPC ............. G06Q 50/14; G06Q 10/06315; G01C 21/3461; G01C 21/3826; G01C 21/3682; G01C 21/3697
See application file for complete search history.

(56) References Cited

U.S. PATENT DOCUMENTS

| | | | |
|---|---|---|---|
| 6,477,503 B1 * | 11/2002 | Mankes ................. | G06Q 10/02 705/5 |
| 8,949,028 B1 * | 2/2015 | Klampfl ............. | G01C 21/3423 701/538 |
| 10,775,183 B2 * | 9/2020 | Ho ......................... | G06Q 10/04 |
| 2020/0019892 A1 * | 1/2020 | Blecharczyk .......... | G06Q 50/14 |
| 2020/0175429 A1 * | 6/2020 | Beaurepaire ........... | G06Q 10/02 |

FOREIGN PATENT DOCUMENTS

| | | | | |
|---|---|---|---|---|
| JP | 2000-321087 A | | 11/2000 | |
| JP | 2011-227827 A | | 11/2011 | |
| JP | 2018-124292 A | | 8/2018 | |
| JP | 2020-051763 A | | 4/2020 | |
| JP | 2021060921 A | * | 4/2021 | ......... G06F 16/2457 |
| WO | 2017/164096 A1 | | 9/2017 | |

* cited by examiner

*Primary Examiner* — Peter D Nolan
*Assistant Examiner* — Demetra R Smith-Stewart
(74) *Attorney, Agent, or Firm* — Dinsmore & Shohl LLP

(57) ABSTRACT

The information display device displays mobility information including a link capable of reserving mobility necessary for traveling between route information while displaying route information regarding a traveling route including a plurality of points at a tourist site, so that the user can make a mobility reservation while confirming the route information.

4 Claims, 5 Drawing Sheets

INFORMATION DISPLAY DEVICE AND INFORMATION DISPLAY SYSTEM

CROSS-REFERENCE TO RELATED APPLICATION

This application claims priority to Japanese Patent Application No. 2022-129094 filed on Aug. 12, 2022 incorporated herein by reference in its entirety.

BACKGROUND

1. Technical Field

The present disclosure relates to an information display device and an information display system.

2. Description of Related Art

Japanese Unexamined Patent Application Publication No. 2011-227827 (JP 2011-227827 A) discloses a technique of searching for a route for minimizing a total traveling time required for traveling when a tourist travels to visit tourist attractions.

SUMMARY

However, in the technique described in JP 2011-227827 A, a transportation when a user such as a tourist travels is not taken into consideration.

The present disclosure provides an information display device and an information display system that can improve the convenience of a user who is considering traveling a tourist site.

In an information display device according to a first aspect, route information related to a traveling route including a plurality of points at a tourist site is displayed, and mobility information including a link with which a mobility required for traveling is able to be reserved is displayed between items of the route information.

The information display device according to the first aspect displays the information related to the traveling route to the user by displaying the route information related to the traveling route including the points at the tourist site. In addition, displaying the mobility information including the link with which the mobility required for traveling can be reserved between the items of the route information makes it possible to reserve the mobility while the route information is confirmed. In particular, since the mobility information is displayed between the items of the route information, it is not troublesome to search for the mobility reservation information as compared with a case where the mobility information is displayed at the end of the browsing page or the like. Here, the "tourist site" is not limited to a region in which a tourist property such as a natural landscape is developed. As used herein, the term "tourist site" is a concept that broadly includes a region that is not generally known as a tourist site as long as the user is aimed at tourism.

In the information display device according to a second aspect, according to the first aspect, a plurality of items of the route information is displayed in a selectable state by a user, and the mobility information in accordance with the item of the route information selected by the user is displayed.

The information display device according to the second aspect can present the multiple items of the route information to the user. Further, displaying the mobility information in accordance with the route information selected by the user makes it possible to reserve the mobility without the user getting lost.

In the information display device according to a third aspect, according to the first aspect, the mobility information related to a plurality of types of the mobility is displayed, and the mobility suitable for the traveling route is displayed as a recommended mobility.

In the information display device according to the third aspect, the user can reserve multiple types of the mobility. Further, displaying the recommended mobility makes it possible to encourage the user to reserve the mobility suitable for the traveling route.

In the information display device according to a fourth aspect, according to the first aspect, information including a type of the mobility and the number of reservable units of the mobility is displayed as the mobility information.

In the information display device according to the fourth aspect, since the number of reservable units is displayed, it is possible to simultaneously confirm whether the mobility can be reserved while the user confirms the information of the traveling route.

An information display system according to a fifth aspect includes: the information display device according to any one of the first aspect to the fourth aspect; and a server that stores information related to the number of reservable units of the mobility. The information related to the number of reservable units of the mobility is displayed together with the route information.

In the information display system according to the fifth aspect, displaying the number of reservable units of the mobility acquired from the server makes it possible to reflect the number of reservable units in the display contents when the number of reservable units is updated.

As described above, according to the information display device and the information display system of the present disclosure, the convenience of the user who is considering traveling a tourist site can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An information display system S including an information display device according to an embodiment will be described with reference to the drawings.

Overall Configuration

Figure 1:
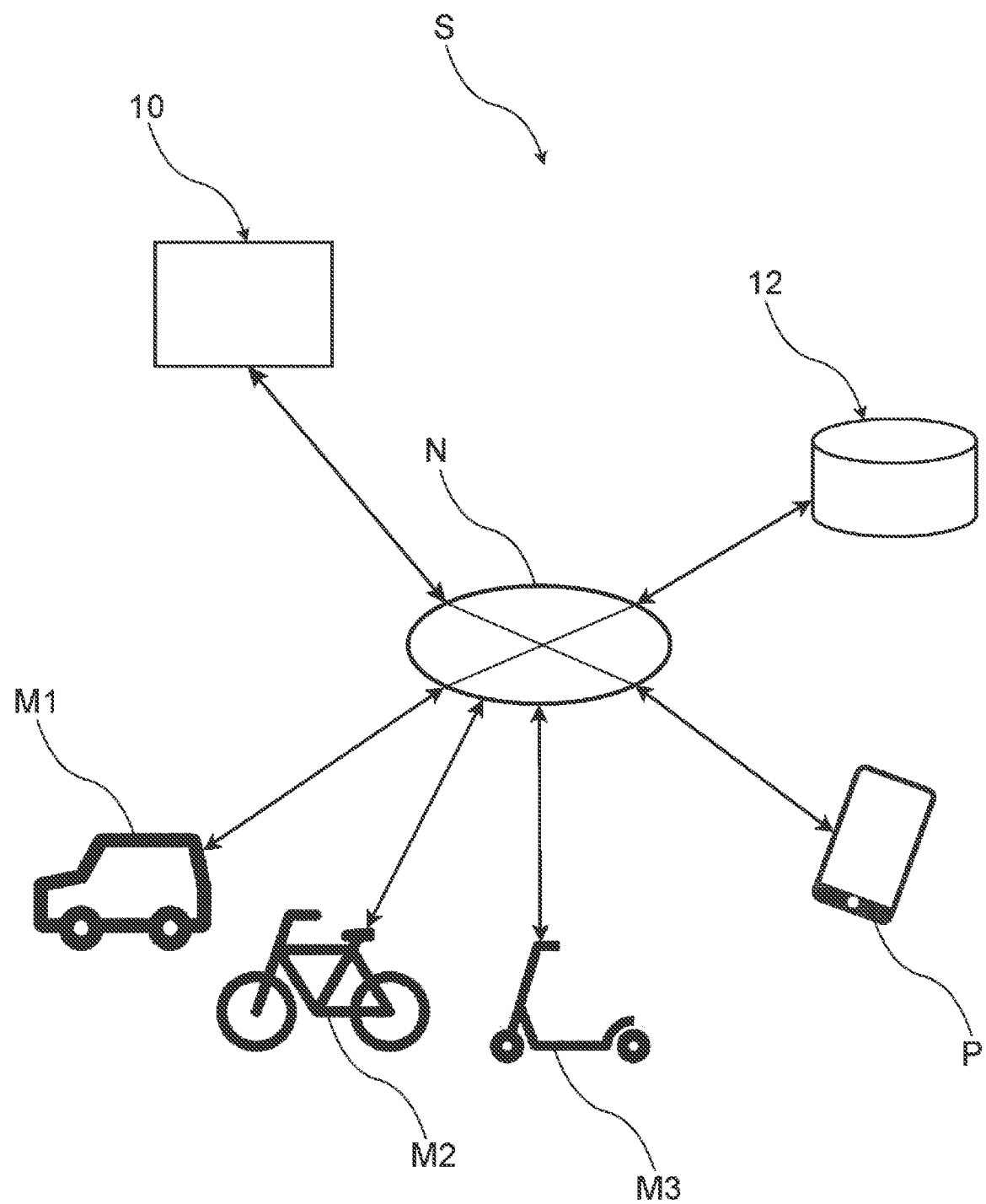
FIG. 1 is a diagram illustrating an overall configuration of an information display system according to an embodiment.

As illustrated in FIG. 1, the information display system S includes an information display device 10, server 12, and a plurality of mobility M1, M1, M3. In addition, the information display device 10, the server 12, and the plurality of mobility M1, M2, M3 can communicate with each other via the network N. Although three types of mobility are illustrated in FIG. 1 as an example, the information display system S is not limited to this. The information display system S may include four or more types of mobility.

The mobility M1 indicates a vehicle driven by a user. Although only one motor vehicle is shown in FIG. 1, a plurality of motor vehicles may be included. The mobility M2 indicates an electric bicycle driven by a user. Although only one electric bicycle is illustrated in FIG. 1, a plurality of electric bicycles may be included. The mobility M3 indicates an electric kickboard driven by a user. Although only one electric kick board is illustrated in FIG. 1, a plurality of electric kick boards may be included. Further, the terminal P carried by the user and the information display device 10 can communicate with each other via the network N.

The information display system S is configured as described above. The information display device 10 according to the present embodiment displays the mobility information related to the mobility M1, M2, M3 between the route information while displaying the route information related to the traveling route of the tourist site to the terminal P of the user.

Hardware Configuration of the Information Display Device 10

Figure 2:
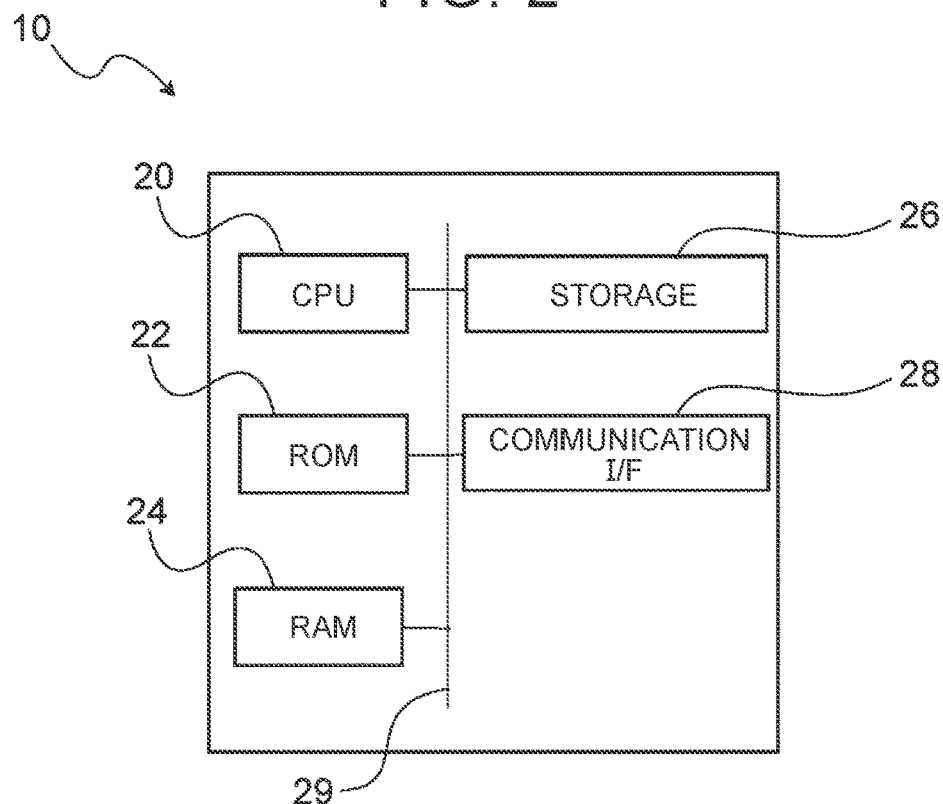
FIG. 2 is a block diagram illustrating a hardware configuration of the information display device according to the embodiment.

FIG. 2 is a block diagram illustrating a hardware configuration of the information display device 10. As illustrated in FIG. 2, the information display device 10 includes a Central Processing Unit (CPU (processor) 20, a Read Only Memory (ROM) 22, Random Access Memory (RAM) 24, a storage 26, and a communication I/F (communication interface) 28. The components above are connected via a bus 32 so as to be mutually communicable.

CPU 20 is a central processing unit. CPU 20 executes various programs and controls each unit. That is, CPU 20 reads the program from ROM 22 or the storage 26, and executes the program using RAM 24 as a working area. In addition, CPU 20 performs control of the above-described configurations and various arithmetic processes in accordance with programs recorded in ROM 22 or the storage 26.

ROM 22 stores various programs and various data. RAM 24 is a non-transitory recording medium that temporarily stores programs/data as a working area. The storage 26 is configured by Hard Disk Drive (HDD) or Solid State Drive (SSD). The storage 26 is a non-transitory recording medium that stores various programs including an operating system and various data. In the present embodiment, the storage 26 stores an information display program for performing information display processing, various data, and the like.

The communication I/F 28 is an interface for the information display device 10 to communicate with the server 12 and other devices. As the communication I/F 28, for example, standards such as Controller Area Network (CAN), Ethernet (registered trademark), Long Term Evolution (LTE, Fiber Distributed Data Interface (FDDI, and Wi-Fi (registered trademark) are used.

Hardware Configuration of the Server 12

Figure 3:
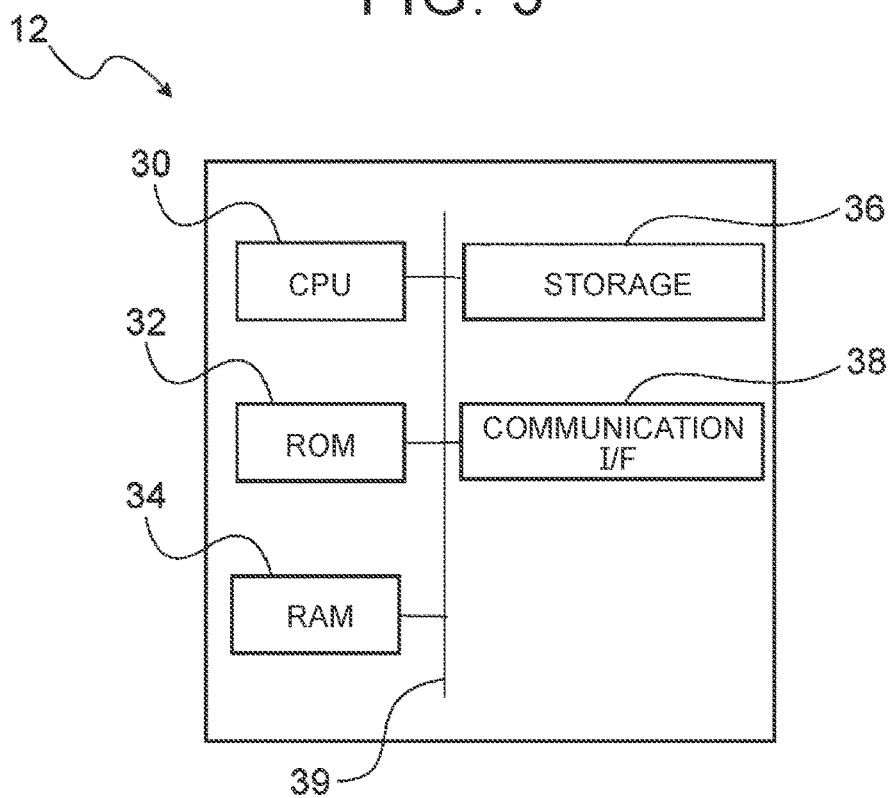
FIG. 3 is a block diagram illustrating a hardware configuration of a server according to the embodiment.

As shown in FIG. 3, the server 12 are configured to include CPU 30, ROM 32, RAM 34, storages 36, and communication interfaces (including communication I/F 38). The components are communicably connected to each other via an internal bus 39.

CPU 30 is a central processing unit. CPU 30 executes various programs and controls each unit. That is, CPU 30 reads the program from ROM 32 or the storage 36, and executes the program using RAM 34 as a working area. In addition, CPU 30 performs control of the above-described configurations and various arithmetic processes in accordance with programs recorded in ROM 32 or the storage 36.

ROM 32 stores various programs and various data. RAM 34 temporarily stores a program/data as a working area. The storage 36 is a non-transitory recording medium configured by Hard Disk Drive (HDD) or Solid State Drive (SSD) and storing various programs including an operating system and various types of data. In the present embodiment, ROM 32 or the storage 36 stores data such as a reserved state for each mobility M1, M2, M3.

The communication I/F 38 are interfaces for the server 12 to communicate with other devices. As the communication I/F 38, for example, standards such as CAN, Ethernet, and LTE, FDDI, Wi-Fi are used.

Functional Configuration of the Information Display Device 10

The information display device 10 realizes various functions using the above-described hardware resources. The functional configuration realized by the information display device 10 will be described with reference to FIG. 4.

Figure 4:
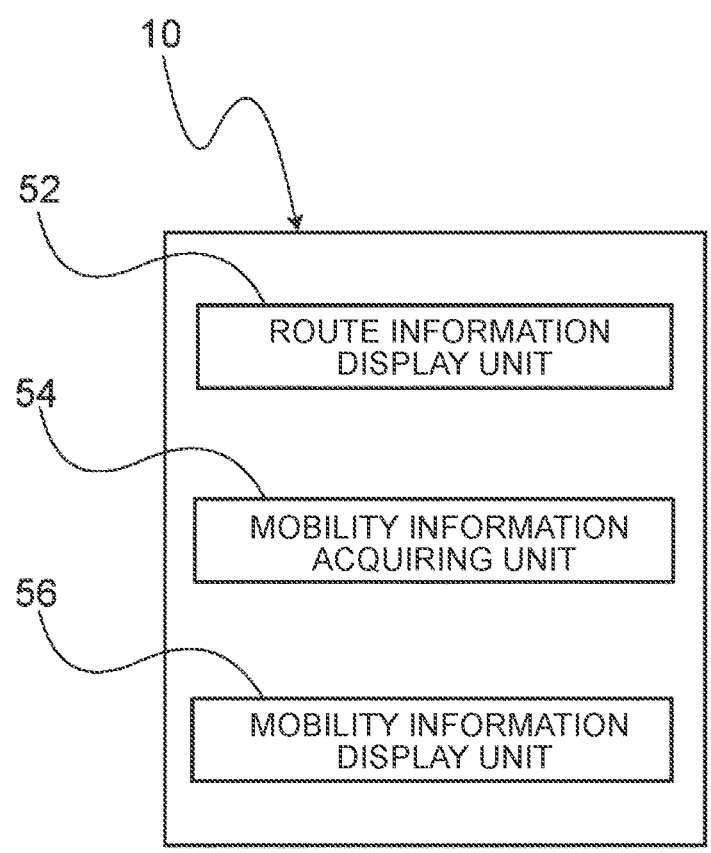
FIG. 4 is a block diagram illustrating a functional configuration of the information display device according to the embodiment.

As illustrated in FIG. 4, the information display device 10 includes, as a functional configuration, a route information display unit 52, a mobility information acquiring unit 54, and a mobility information display unit 56. The respective functional configurations are realized by CPU 20 reading and executing a program stored in ROM 22 or the storage 26.

The route information display unit 52 displays route information related to a traveling route including a plurality of points at a tourist site. In particular, in the present embodiment, as an example, a plurality of pieces of route information is displayed in a state selectable by the user.

Figure 5:
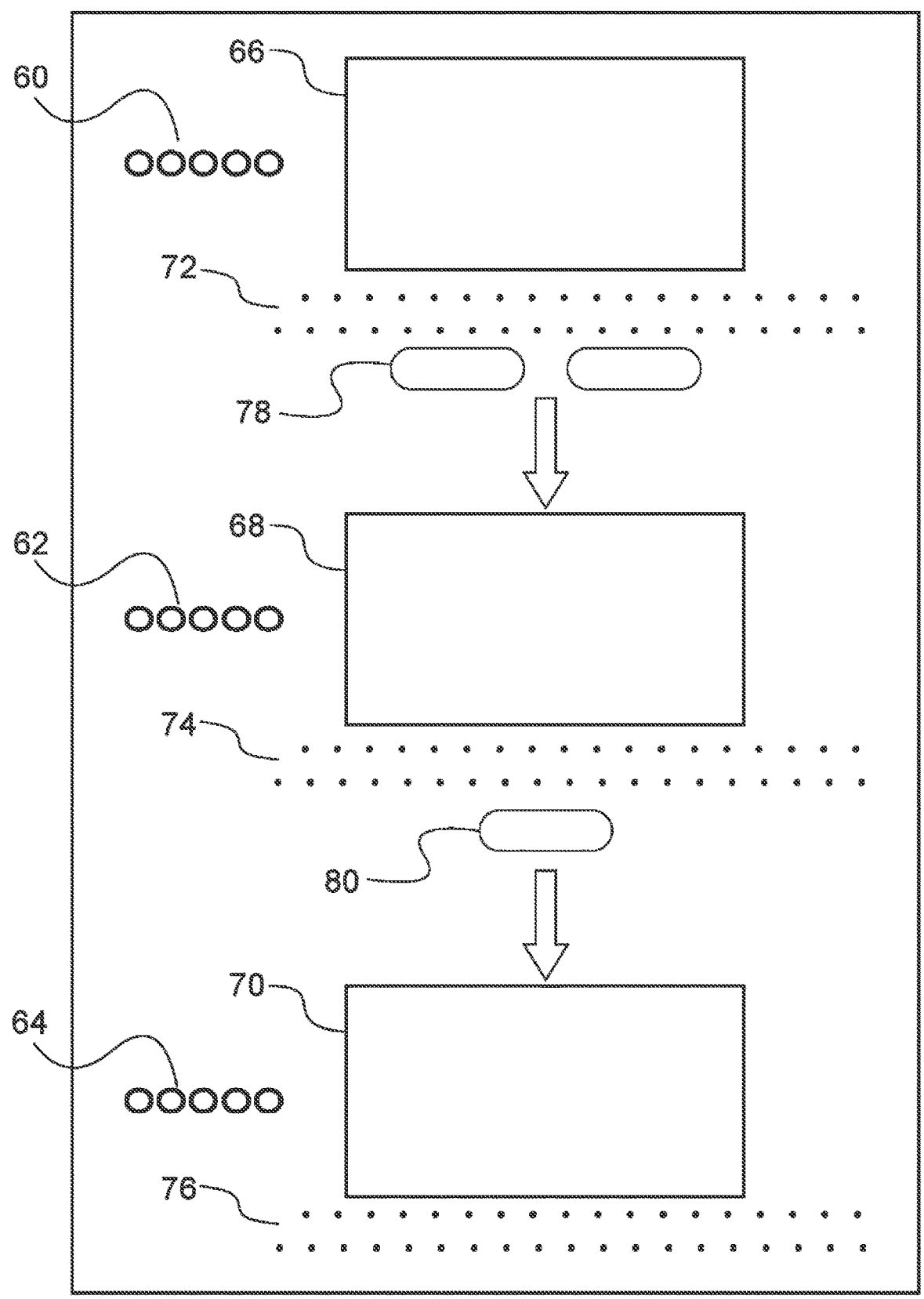
FIG. 5 is a diagram illustrating a display example of cyclic information according to the embodiment.

FIG. 5 is a diagram illustrating a display example of cyclic information according to the embodiment. Specifically, this is a display example displayed on the terminal P of the user. Note that the display example illustrated in FIG. 5 is merely an example. The layout and display contents are not limited to FIG. 5.

As shown in FIG. 5, headings 60, 62, and 64 are displayed at the left end of the display area. The headings 60, 62, and 64 are headings indicating the contents of each point constituting the traveling route. An image 66 is displayed adjacent to the heading 60. An image 68 is displayed adjacent to the heading 62. An image 70 is displayed adjacent to the heading 64.

The image 66 is image data such as a photograph captured at the location of the heading 60. Similarly, image 68 is image data, such as a photograph taken at the point of heading 62. The image 70 is image data such as a photograph captured at the location of the heading 64. As described above, since the headings and the images are displayed adjacent to each other, the user can quickly grasp information on each point (sightseeing spot) of the traveling route.

An explanatory note 72 is displayed below the image 66. Similarly, an explanatory note 74 is displayed below the image 68. An explanatory note 76 is displayed on the lower side of the image 70. A continuation of the route information is described below the explanatory note 76, and the subsequent route information can be visually recognized by scrolling the display area by the user's operation.

As described above, the route information display unit 52 of the present embodiment displays the headings 60, 62, and 64, the images 66, 68, and 70, and the explanatory notes 72, 74, and 76 as route information.

The mobility information acquiring unit 54 illustrated in FIG. 4 acquires, from the server 12, information regarding the respective reservable numbers of mobility M1, M2, M3. For example, the server 12 stores, for each of the mobility M1, M2, M3, information including the total number of units, the number of units in use, and the number of unused units. The mobility information acquiring unit 54 acquires the number of unused units for each mobility M1, M2, M3.

The mobility information display unit 56 displays mobility information including a link that allows reservation of mobility necessary for patrol during route information. In particular, in the present embodiment, the mobility information display unit 56 displays, as the mobility information, information including the type of mobility and the number of reservable units together with the route information.

In the display example of FIG. 5, mobility information 78 is displayed below the explanatory note 72. In the present embodiment, two mobility candidates suitable for moving from the location of the heading 60 to the location of the heading 62 are displayed as the mobility information 78, and the type of mobility and the number of available reservations are displayed respectively. For example, the mobility information display unit 56 may display mobility information such as "five remaining electric bicycles" and "three remaining electric kick boards" as the mobility information 78. In addition, the mobility information display unit 56 may display an image such as a pictogram and a photograph capable of specifying the type of mobility.

Furthermore, when displaying a plurality of mobility candidates, the mobility information display unit 56 of the present embodiment displays the recommended mobility recommended in accordance with the route information. For example, when an image of an electric bicycle and an image of an electric kick board are displayed as the mobility information 78, a word such as "recommended" may be displayed on the basis of more suitable mobility. Also, for example, images of more suitable mobility may be displayed with emphasis over images of other mobility. Even in this case, the user can recognize that the mobility is recommended.

The mobility information 80 is displayed below the explanatory note 74. In the mobility information 80, only one mobility candidate suitable for moving from the location of the heading 62 to the location of the heading 64 is displayed. Note that, in a case where all of the traveling routes are moved by one mobility, the mobility information 80 may not be displayed.

When the user selects other route information, the route information display unit 52 displays route information different from that in FIG. 5. In this case, the mobility information display unit 56 displays mobility information suitable for the route information.

Operations

Next, the operation of the present embodiment will be described.

Display Control Process

Figure 6:
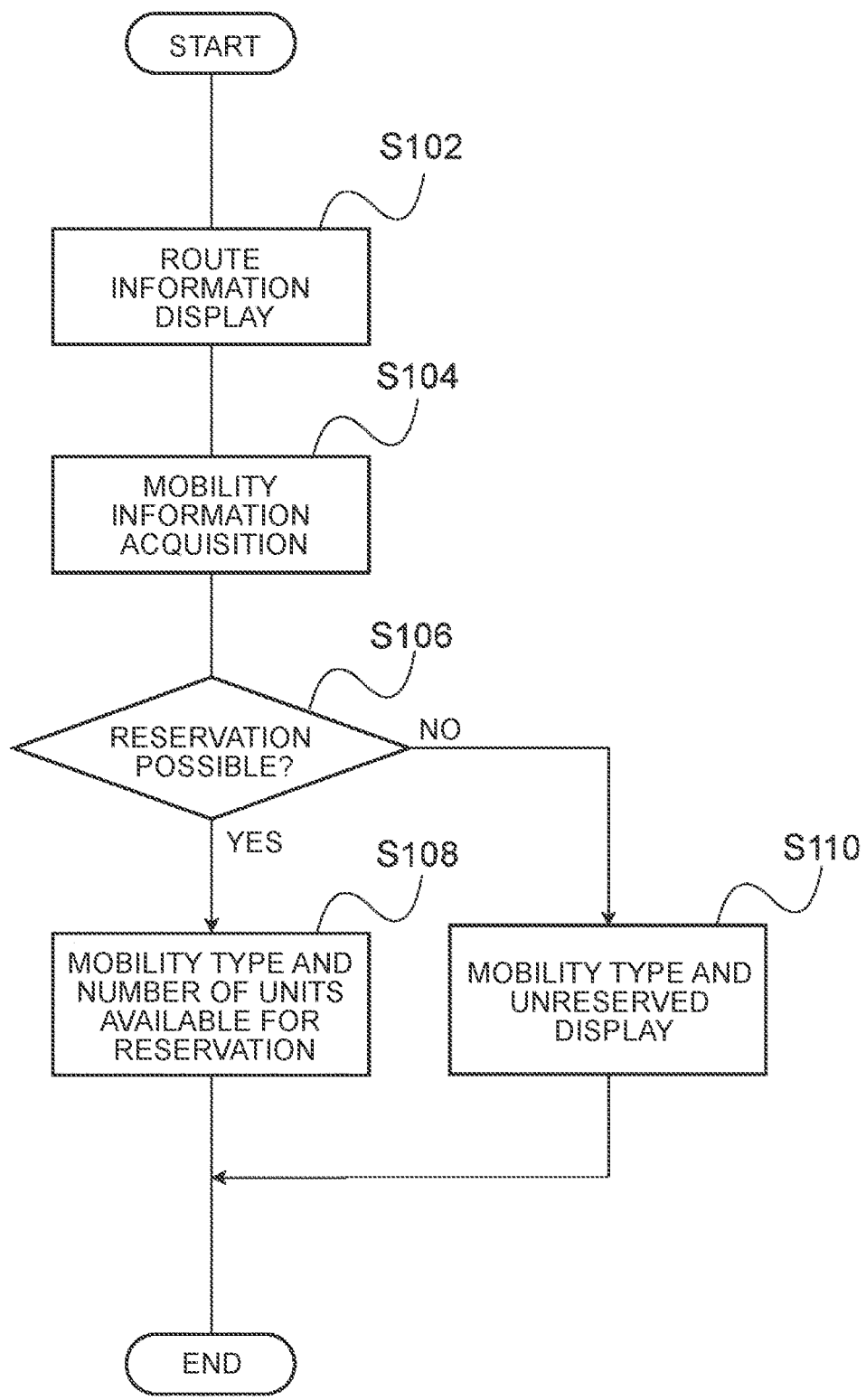
FIG. 6 is a flowchart illustrating an example of a flow of an information display process according to the embodiment.

An example of the information display processing in the present embodiment will be described with reference to a flowchart shown in FIG. 6. CPU 20 reads the display program from ROM 22 or the storage 26, expands the display program in RAM 24, and executes the program, thereby executing the display process. Further, the display process is repeatedly executed at predetermined time intervals.

CPU 20 displays the route information in S102. Specifically, CPU 20 displays the route information on the terminal P of the user by the function of the route information display unit 52.

CPU 20 obtains mobility information in S104. Specifically, CPU 20 acquires the number of reserved mobility M1, M2, M3 from the server 12 by the function of the mobility information acquiring unit 54.

CPU 20 determines whether it can be reserved by S106. Specifically, when the number of reservable units is 0, CPU 20 determines that the reservation cannot be made, S106 is denied, and the process proceeds to S110 process. On the other hand, when the reservable number of CPU 20 is equal to or greater than 1, S106 is affirmative, and the process proceeds to S108 process.

CPU 20 displays the type of mobility and the number of units that can be reserved in S108. Specifically, CPU 20 displays the mobility information in the middle of the route information by the function of the mobility information display unit 56. Then, CPU 20 ends the information-displaying process.

On the other hand, when the reservable number is 0, CPU 20 displays the type of mobility and the reservation impossible in S110. Specifically, CPU 20 displays the type of mobility in the middle of the route information by the function of the mobility information display unit 56, and also performs display indicating that the mobility cannot be reserved. For example, when an image of mobility is displayed, only an image of mobility that cannot be reserved may be displayed in gray. Then, CPU 20 ends the information-displaying process.

As described above, the information display system S and the information display device 10 according to the present embodiment present information about the traveling route to the user by the route information display unit 52 displaying route information about the traveling route including a plurality of points at the tourist site.

In addition, in the present embodiment, the mobility information display unit 56 displays mobility information including a link that allows reservation of mobility necessary for patrol during route information. Accordingly, the user can make a mobility reservation while confirming the route information. In particular, since the mobility information is displayed during the route information, it is not troublesome to search for the mobility reservation information as compared with a case where the mobility information is displayed at the end of the browsing page or the like.

Further, in the present embodiment, a plurality of pieces of route information are presented to the user, and mobility information corresponding to the route information selected by the user is displayed, so that the user can reserve mobility without hesitation.

Furthermore, in the present embodiment, mobility information related to a plurality of types of mobility is displayed, so that the user can reserve a plurality of types of mobility. In addition, by displaying the recommended mobility, it is possible to prompt the user to reserve mobility suitable for the traveling route.

Further, in the present embodiment, since the number of available reservations is displayed, it is possible to simultaneously confirm whether or not mobility reservation is possible while the user confirms information on the traveling route.

The information display system S and the information display device 10 according to the embodiment have been described above. However, it is needless to say that the information display system S and the information display device 10 can be implemented in various forms without departing from the gist of the present disclosure. For example, in the above-described embodiment, only information on a preset traveling route is displayed, but the embodiment is not limited thereto, and the traveling route may be constructed to include a point selected by the user. In this case, only the tourist spot that the user wants to visit can be visited. In addition, mobility information recommended based on the travel distance, the map information, the road surface information, and the like may be displayed on the constructed traveling route.

Further, in the above-described embodiment, the user selects mobility from mobility information, thereby transitioning to a mobility reservation page. However, the embodiments are not limited thereto. For example, in a case where personal information such as payment information is registered in the terminal P in advance, the mobility reservation may be completed without transitioning to a dedicated reservation page.

Further, a part of the traveling route may be changed according to the type of mobility selected by the user. For example, when the mobility selected by the user is a mobility with a relatively low moving speed, a part of the traveling route may be changed so that the total moving distance is shorter than when the mobility with a relatively high moving speed is selected.

Furthermore, in the above implementation, three types of mobility were described: automobiles, electric bicycles, and electric kick boards. However, embodiments are not limited thereto, and more types of mobility information may be displayed. For example, mobility that is not driven by the user himself, such as a taxi, may be included.

What is claimed is:

1. An information display system comprising:
   a plurality of reservable units of mobility;
   an information display device, wherein route information related to a traveling route including a plurality of points at a tourist site is displayed, and mobility information including a link with which a mobility required for traveling of the plurality of reservable units of mobility is able to be reserved is displayed between items of the route information, and
   a server that stores information related to a number of reservable units of the plurality of reservable units of mobility, the information related to the number of reservable units of the plurality of reservable units of mobility is displayed together with the route information,
   wherein:
      the server, the information display device, and the plurality of reservable units of the mobility are in communication,
      each of the plurality of reservable units of mobility are configured to provide the server with whether the respective reservable units of the plurality of reservable units of mobility are in use or unused, and
      the information display device is configured to:
         display the mobility information related to the availability of the number of reservable units of the plurality of reservable units of mobility that are unused, that are based on a plurality of types of the reservable units of the plurality of reservable units of mobility and that are suitable for the traveling route;
         determine most suitable respective reservable units of mobility of the plurality of reservable units of mobility based on the plurality of reservable units of mobility that are unused and the plurality of types of the reservable units of the plurality of reservable units of mobility that are suitable for the traveling route; and
         provide an automatic recommendation for display by providing a displayed emphasis for the determined most suitable respective reservable units of mobility from the plurality of reservable units of mobility.

2. The information display device according to claim 1, wherein:
   a plurality of items of the route information is displayed in a selectable state by a user; and
   the mobility information in accordance with the item of the route information selected by the user is displayed.

3. The information display device according to claim 1, wherein the mobility information related to a plurality of types of the mobility is displayed, and the mobility suitable for the traveling route is displayed as a recommended mobility.

4. The information display device according to claim 1, wherein information including a type of the mobility and the number of reservable units of the mobility is displayed as the mobility information.

* * * * *